(12) United States Patent
Fun

(10) Patent No.: US 6,173,977 B1
(45) Date of Patent: Jan. 16, 2001

(54) MOTOR VEHICLE

(75) Inventor: Johannes Krijn Fun, Mierlo (NL)

(73) Assignee: AB Volvo, Göteborg (SE)

( * ) Notice: Under 35 U.S.C. 154(b), the term of this patent shall be extended for 0 days.

(21) Appl. No.: 09/125,964

(22) PCT Filed: Feb. 25, 1997

(86) PCT No.: PCT/NL97/00085

§ 371 Date: Feb. 1, 1999

§ 102(e) Date: Feb. 1, 1999

(87) PCT Pub. No.: WO97/31794

PCT Pub. Date: Sep. 4, 1997

(30) Foreign Application Priority Data

Feb. 29, 1996 (NL) .................................................. 1002490

(51) Int. Cl.$^7$ ............................... B60G 7/00; B60P 7/00; B62D 7/00
(52) U.S. Cl. ..................................................... 280/124.116
(58) Field of Search ........................ 280/124.134, 124.1, 280/86.75, 86.751, 124.11, 124.117, 124.121, 124.125, 124.128, 124.132, 124.153, 124.116

(56) References Cited

U.S. PATENT DOCUMENTS

| 4,530,513 | 7/1985 | Kijima et al. . |
| 4,603,882 | 8/1986 | Kijima et al. . |

(List continued on next page.)

FOREIGN PATENT DOCUMENTS

| 32 05 783 | 8/1983 | (DE) . |
| 33 15 735 | 11/1983 | (DE) . |

(List continued on next page.)

OTHER PUBLICATIONS

Patent Abstracts of Japan, vol. 008, No. 096 (M–294), May 4, 1984 & JP 59 011906 A (Tokyo Kogyo KK), Jan. 21, 1984.

(List continued on next page.)

*Primary Examiner*—Kevin Hurley
*Assistant Examiner*—Kevin McKinley
(74) *Attorney, Agent, or Firm*—Pennie & Edmonds LLP

(57) ABSTRACT

The invention relates to a motor vehicle comprising steerable front wheels supporting the vehicle and rear wheels supporting the vehicle, at least one rear wheel of which is coupled, by means of an at least substantially horizontal axle journal extending transversely to the longitudinal direction of the vehicle, to a wheel suspension arm (1) extending at least substantially in the longitudinal direction of the vehicle. The wheel suspension arm (1) is capable of pivoting movement with respect to the other part of the vehicle about a horizontal pivot axis extending at least substantially perpendicularly to the longitudinal direction of the vehicle, whereby said rear wheel is capable of pivoting movement against spring force about an upwardly extending pivot axis (8) with respect to said wheel suspension arm from the position intended for normal forward movement The upwardly extending pivot axis (8) is positioned behind the axle journal of the rear wheel, seen in the intended direction of forward movement. The axle journal of the rear wheel is attached to a wheel suspension member, which is capable of pivoting movement with respect to said wheel suspension arm about said upwardly extending pivot axis (8) and which is capable of tilting movement about a tilting axis extending transversely to the longitudinal direction of the vehicle, whilst a coupling rod (18) is provided between a coupling point which is located on said wheel suspension member and is spaced from the upwardly extending pivot axis by some distance and a coupling point which is located on said wheel suspension arm, which coupling rod is provided with resilient means, all this in such a manner that the distance between said coupling points can change as a result of deformation of said resilient means.

7 Claims, 5 Drawing Sheets

U.S. PATENT DOCUMENTS

| | | | |
|---|---|---|---|
| 5,098,118 | * | 3/1992 | Hayashi et al. ............... 280/691 |
| 5,895,063 | * | 4/1999 | Hasshi et al. ............ 280/24.134 |

FOREIGN PATENT DOCUMENTS

| | | |
|---|---|---|
| 34 10 115 | 10/1985 | (DE) . |
| 39 00 336 | 7/1990 | (DE) . |
| 2 700 992 | 8/1984 | (FR) . |
| 2 707 560 | 1/1995 | (FR) . |
| 2 726 227 | 5/1996 | (FR) . |

OTHER PUBLICATIONS

Patent Abstracts of Japan, vol. 009, No. 067 (M–366), Mar. 27, 1985 & JP 59 199312 A (Fuji Jukogyo KK), Nov. 12, 1984.

Patent Abstracts of Japan, vol. 12, No. 227 (M–713), Jun. 28, 1988 & JP 63 022710 A (Fuji Heavy Ind. Ltd.), Jan. 30, 1988.

Patent Abstracts of Japan, vol. 015, No. 475 (M–1186). Dec. 3, 1991 & JP 03 204322 A (Suzuki Motor Corp.), Sep. 5, 1991.

* cited by examiner

MOTOR VEHICLE

BACKGROUND OF THE INVENTION

The invention relates to a motor vehicle comprising steerable front wheels supporting the vehicle and rear wheels supporting the vehicle, at least one rear wheel of which is coupled, by means of an at least substantially horizontal axle journal extending transversely to the longitudinal direction of the vehicle, to a wheel suspension arm extending at least substantially in the longitudinal direction of the vehicle, which arm is capable of pivoting movement with respect to the other part of the vehicle about a horizontal pivot axis extending at least substantially perpendicularly to the longitudinal direction of the vehicle, whereby said rear wheel is capable of pivoting movement against spring force about an upwardly extending pivot axis with respect to said wheel suspension arm from the position intended for normal forward movement, in which said upwardly extending pivot axis is positioned behind the axle journal of the rear wheel, seen in the intended direction of forward movement, the axle journal of said rear wheel is attached to a wheel suspension member, which is capable of pivoting movement with respect to said wheel suspension arm about said upwardly extending pivot axis, whilst a coupling rod is provided between a coupling point which is located on said wheel suspension member and is spaced from the upwardly extending pivot axis by some distance and a coupling point which is located on said wheel suspension arm, which coupling rod is provided with resilient means, all this in such a manner that the distance between said coupling points can change as a result of deformation of said resilient means.

SUMMARY OF THE INVENTION

In a similar motor vehicle known from DE-34.10.115 the rear wheel can pivot about the upwardly extending pivot axis in order to counteract a tendency to oversteer during steering manoeuvres. A drawback of the known vehicle is the fact that the rear wheel is also pivoted about the pivot axis in the case of a change in the mechanical load on the wheel in vertical direction, which is undesirable.

The object of the invention is to obtain a motor vehicle of the above kind, wherein the wheel is prevented from pivoting about the pivot axis in the case of a vertical load, whilst the wheel is still allowed to pivot about the pivot pin when a transverse force is exerted on the wheel.

According to the invention this objective can be accomplished in that the wheel suspension member is capable of tilting movement about a tilting axis extending transversally to the longitudinal direction of the vehicle, whilst said upwardly extending pivot axis intersects the ground in a point which lies at least substantially in the central longitudinal plane of the respective rear wheel during forward movement.

In the case of a change in the wheel load in vertical direction the wheel suspension member is subjected to a force which attempts to pivot the wheel suspension member outwards about the pivot axis and which will tilt the wheel suspension member about the tilting axis. The coupling rod connected to the wheel carrier will undergo a change in length as a result of the load being applied to the wheel suspension member. Simultaneously with the change in length of the coupling rod tilting of the wheel suspension member and consequently of the coupling rod connected thereto will take place. The combined tilting movement and change in length of the coupling rod will prevent pivoting of the wheel suspension member.

When a transverse force is exerted on the rear wheel, the wheel suspension member will be pivoted about the pivot pin and hardly any tilting of the wheel suspension arm about the tilting axis will take place. As indicated above, the wheel load variation that occurs when a transverse load is applied will have no influence on the steering angle.

When the vehicle negotiates a bend the wheels can adapt their positions to the driving conditions by pivoting about the upwardly extending pivot axes, thus counteracting said tendency to oversteer and making it possible to make the connection between the torsion bar(s) and the other part of the vehicle less stiff, which will substantially contribute towards enhancing the driving comfort.

Preferably the upwardly extending pivot axis will thereby intersect the ground in a point which lies at least substantially in the central longitudinal plane of the respective rear wheel during forward movement, in order to avoid undesirable pivoting of the rear wheels about the upwardly extending pivot axes during braking.

In order to be able to effect this without a conflict arising because of the presence of a braking mechanism, which is usually provided within the wheel circumference, the pivot axis is according to the invention designed to slope upwards from the point where the pivot axis intersects the ground in the direction of the central longitudinal plane of the vehicle, as a result of which the bearings defining the pivot axis can be positioned in places where they do not impede the provision of the braking mechanism.

The invention will be explained in more detail hereafter with reference to the accompanying Figures.

DETAILED DESCRIPTION OF THE INVENTION

Figure 1:
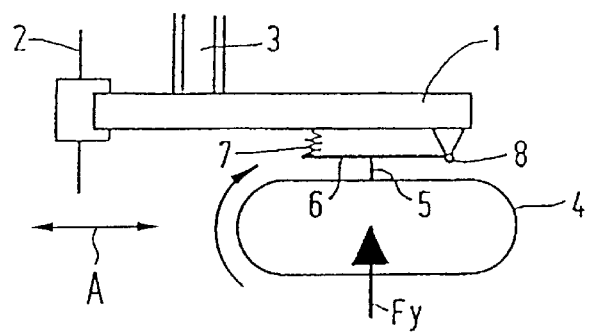
FIGS. 1–14 are diagrammatic illustrations, with reference to which the the operation of the construction according to the present invention will be explained.

FIG. 1 diagrammatically shows a wheel suspension arm 1, which can pivot with respect to the vehicle (not shown) about a horizontal pivot axis 2 extending perpendicularly to the longitudinal direction of the vehicle. Wheel suspension arm 1 is thereby coupled to a flexurally stiff and at the same time torsionally weak cross beam 3, which extends horizontally and transversely to the longitudinal direction of the vehicle. Constructions of this type are generally known in the automobile construction industry and need not be explained in more detail, therefore.

As is furthermore diagrammatically shown in FIG. 1, a rear wheel 4 is connected to a suspension member 6 by means of an axle journal 5 which normally extends horizontally and perpendicularly to the longitudinal direction of the vehicle. Suspension member 6 can pivot against spring force (diagrammatically indicated by means of a spring 7) from a central position, which rear wheel 4 occupies during normal straight-ahead driving, about an upwardly extending pivot axis 8' with respect to wheel suspension arm 1. As will be apparent from the Figure, said pivot pin 8 is positioned behind the vertical plane through the axle journal 5 of wheel 4, seen in the intended direction of forward movement indicated by arrow A.

When this construction is used, a transverse force will be exerted on wheel 4 when the vehicle supported by wheel 4 negotiates a bend, for example in the direction indicated by arrow Fy. Wheel 4 can pivot about the upwardly extending pivot axis 8', in the direction of arrow B, against the action of spring mechanism 7 under the influence of said transverse force Fy. It will be apparent that the wheel 4 occupying the outside bend position will pivot in the direction of the respective wheel suspension arm 1 with its front part, whilst the wheel 4 occupying the inside bend position will pivot in a direction away from the respective wheel suspension arm with its front part.

In this way the rear wheels will be able to pivot about the upwardly extending pivot pins, albeit through a limited angle, when negotiating a bend, in order to counteract the tendency to oversteer that occurs with constructions which do not enable such pivoting of the rear wheels 4.

Figure 2:
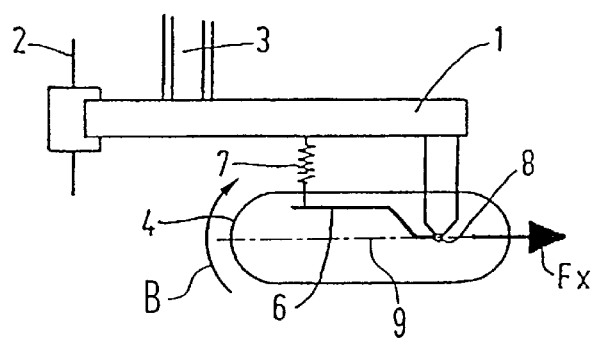
Figure 3:
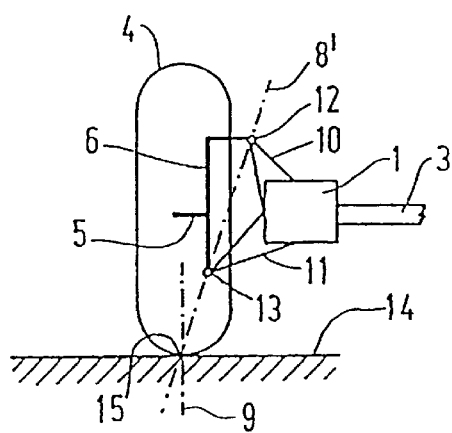
Figure 4:
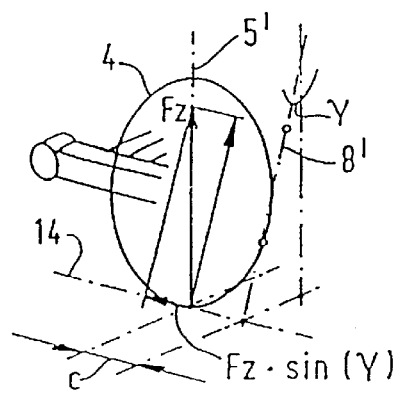

When in the embodiment according to FIG. 1 a braking force Fx (FIG. 2) is exerted on wheel 4, said braking force, which is theoretically exerted in the central longitudinal plane 9 of the wheel, in a direction opposed to the direction of arrow A, will generate a torque about the upwardly extending pivot axis 8', which torque would cause wheel 4 to pivot undesirably about the upwardly extending pivot axis 8'. In order to prevent this it would be necessary to position pivot axis 8' in the central longitudinal plane of the wheel, as is diagrammatically shown in FIG. 2. Generally it will not be possible to realise this in practice, since the wheel usually accommodates the braking mechanism as well. In order to overcome this problem two arms 10 and 11, which slope upwards and downwards respectively from wheel suspension arm 1, may be attached to wheel suspension arm 1, with bearings 12 and 13 supporting the suspension member 6 being mounted on the free ends of said arms, said bearings being disposed in such a manner as to form an imaginary upwardly sloping pivot axis 8', which intersects the central longitudinal plane 9 of wheel 4 near roadway 14 in point 15 and which slopes upwards from said point in the direction of the central longitudinal plane of the vehicle. As is indicated in FIG. 4, however, point 15 is thereby spaced from vertical plane 5' through wheel axle 5 by a distance e. When pivot axis 8' includes an angle $\Gamma$ with the vertical, the resolved Fz sinus $\Gamma$ of the wheel load Fz will produce a moment M=e Fz sinus $\Gamma$ about pivot axis 8, which moment tends to pivot wheel 4 outwards about the upwardly extending pivot axis 8', as will be apparent from FIG. 4.

Figure 5:
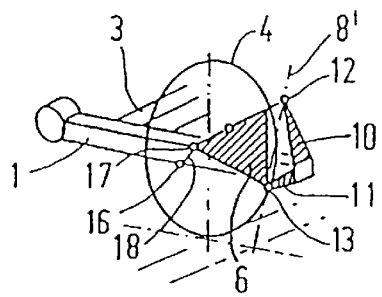

In order to prevent this, as shown in FIG. 5, a coupling rod 18 may be provided on wheel suspension arms 1 at a point 16 on wheel suspension member 6 that is spaced from bearings 12 and 13 and at a point 17 on the wheel suspension arms 1 that is positioned lower than point 16, in such a manner that said coupling rod 18 is capable of some pivoting movement with respect to suspension member 6 and wheel suspension arm 1 in points 16 and 17 respectively, whilst coupling rod 18 is furthermore provided with resilient means, such that the effective length of coupling rod 18 between points 16 and 17 can be slightly increased under the influence of tensile forces being exerted on coupling rod 18.

Figure 6:
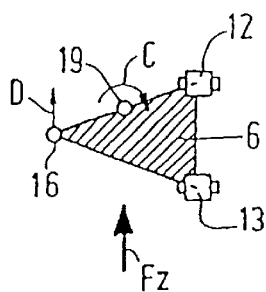

Preferably the construction of at least one of the coupling points 12 and 13 is furthermore such that suspension member 6 can pivot against spring force about an imaginary pivot axis 19 extending parallel to wheel axle 5 (FIG. 6).

Coupling rod 18 will prevent the wheel from pivoting outwards about the upwardly extending pivot axis 8'.

The fact of the matter is that as the wheel load Fz increases, as indicated in FIG. 6, wheel suspension member 6 will tend to pivot outwards about pivot axis 8'. A tensile force is thereby produced in coupling rod 18 as a result of the outwardly pivoting moment about pivot axis 8' becoming larger, as a result of which the effective length of coupling rod 18 will increase due to the presence of the resilient means therein.

Figure 7:
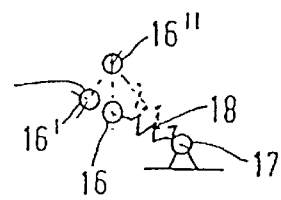

As a result of the extension of the coupling rod 18 coupling point 16 will want to move from the position 16 shown in FIG. 7 to position 16', as it were. Also suspension member 6 will thereby pivot about the imaginary pivot axis 19 under the influence of the wheel load, as a result of which coupling point 16 will tend to move from the position 16' shown in FIG. 7, in the direction indicated by arrow D (FIG. 6), to the higher position 16".

An advantageous selection of the length of coupling rod 18 and of the position and construction of the various coupling points will thus make it possible to prevent wheel 4 from pivoting outwards about the upwardly extending pivot axis 8', also with varying loads.

Thus it has become possible in the above-described manner to achieve a rear wheel suspension that does not exhibit undesirable changes in the position of the wheel parallel to the longitudinal axis of the vehicle with respect to the other part of the vehicle due to varying wheel loads and braking forces during forward movement, whilst the wheel will only pivot about an upwardly extending pivot pin under the influence of the transverse forces being exerted on the wheel when a bend is being negotiated, in such a manner that no oversteering will take place.

Figure 15:
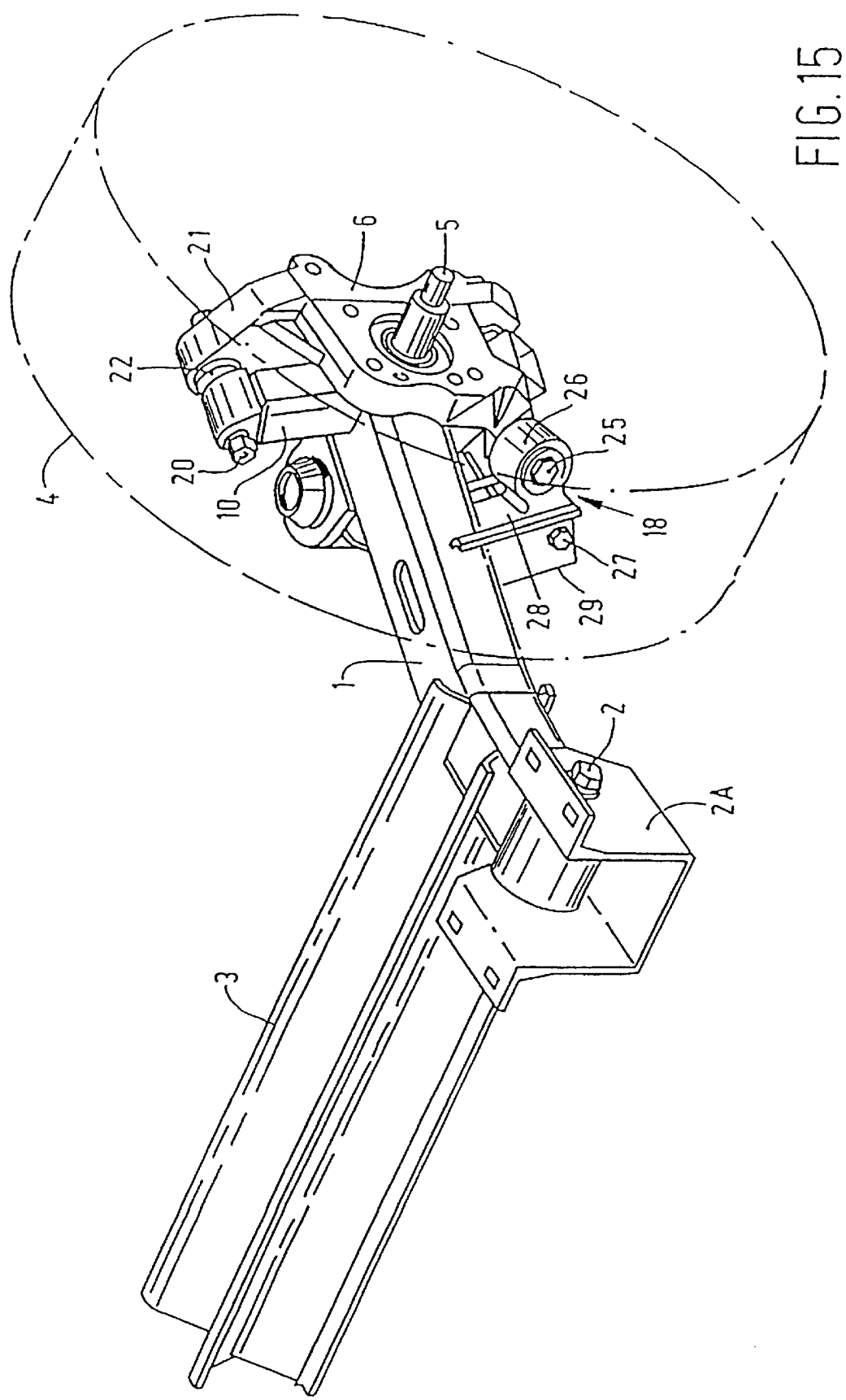
FIG. 15 is a diagrammatic perspective view of a first embodiment of the construction according to the invention.
Figure 16:
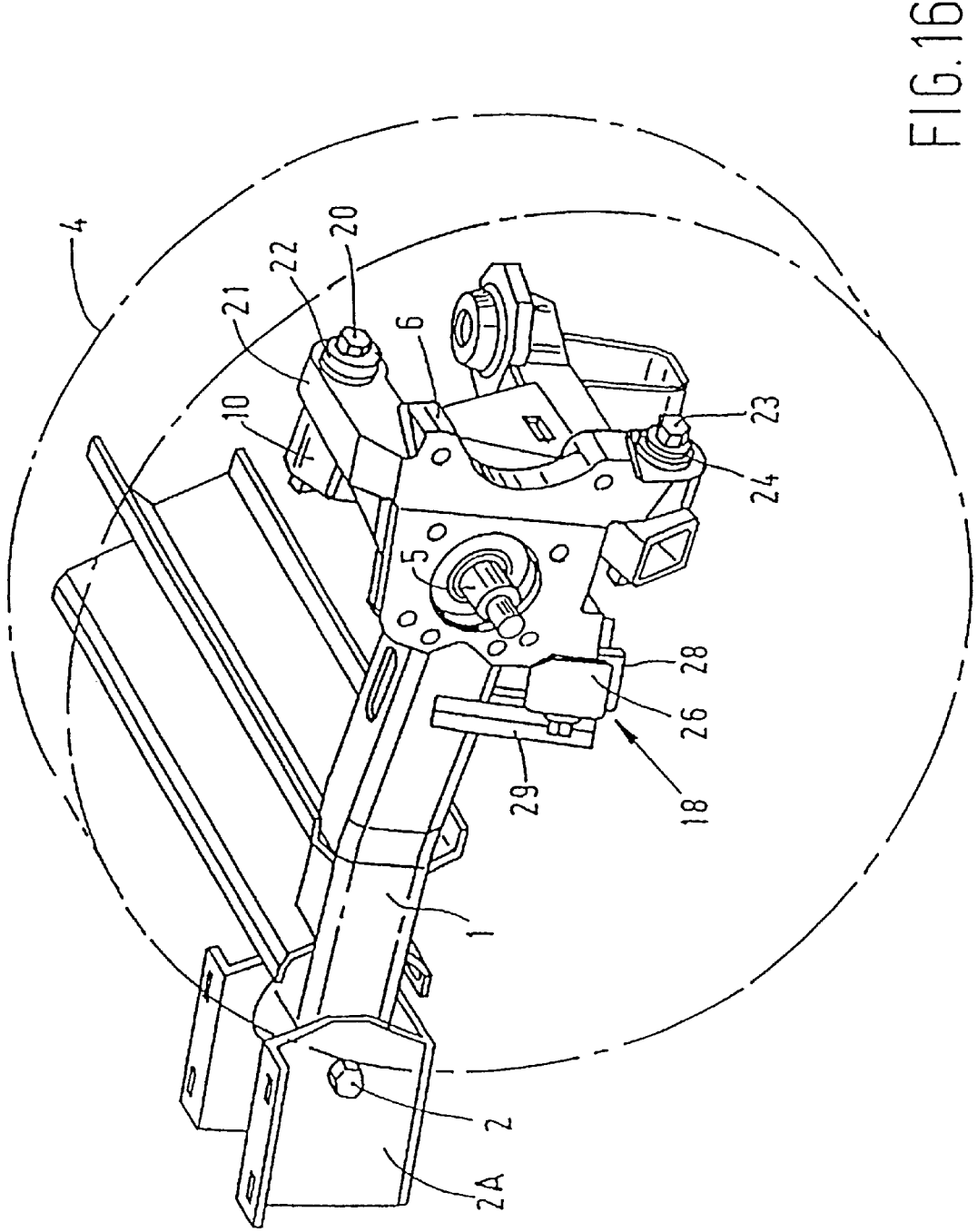
FIG. 16 is likewise a perspective view of the construction shown in FIG. 15, which shows the construction from a different angle than in FIG. 15, however.

FIGS. 15 and 16 show a possible embodiment of the above-described wheel suspension. In FIGS. 15 and 16 like parts are as much as possible indicated by the same numerals as in the Figures that have been discussed above.

As is shown in FIGS. 15 and 16, a wheel suspension arm 1 is pivoted to a U-shaped support 20 by means of a pivot axis 2, which support may be attached to the vehicle (not shown). A flexurally stiff but torsionally weak beam 3 is provided between the two wheel suspension arms 1 of rear wheels 4.

The upwardly extending arm 10 mounted on one end of wheel suspension arm 1 is at its upper side provided with a bore extending substantially in the longitudinal direction of the vehicle, which accommodates a bolt 20. The end of said bolt that projects from suspension member 10 is accommodated in a bore formed in the upper end of an arm 21 which is attached to wheel suspension member 6, whereby the end of the bolt that is accommodated within said arm 21 is surrounded by a bush 22 consisting of rubber or a similar elastic material, which in fact forms the bearing 12 referred to above.

In a similar manner part of a bolt 23 attached to arm 11 and extending parallel to bolt 20 extends through a bore formed in wheel suspension member 6, whereby the part of the bolt 23 that is accommodated within the bore in the wheel suspension member is likewise surrounded by a bush 24 made of rubber or a similar resilient material, which in fact forms the bearing 13 referred to above.

The construction of said bushes 22 and 24 of resilient material is such that they permit pivoting of suspension member 6 against spring force about the imaginary upwardly extending pivot axis 8 and also about imaginary pivot axis 19.

FIGS. 15 and 16 furthermore show coupling rod 18. As will be apparent from these Figures, coupling point 16 is formed by a bolt 25 secured to suspension member 6, which bolt extends within an eye 26 provided on one end of the coupling rod, whilst a bush consisting of rubber or a similar resilient material is provided between the outer circumference of pin 25 and the inner circumference of eye 26. In a similar manner coupling point 17 is made up of a pin 27, which is positioned within an eye 28 provided on the other end of coupling rod 18, whereby a bush made of rubber or a similar resilient material is likewise provided between the inner wall of eye 28 and the outer circumference of pin 27. The end of pin 27 is thereby attached to arms 29 extending downwards from wheel suspension arm 1. The bushes of resilient material provided in eyes 26 and 28 allow the above-described extension of coupling rod 18.

Figure 8:
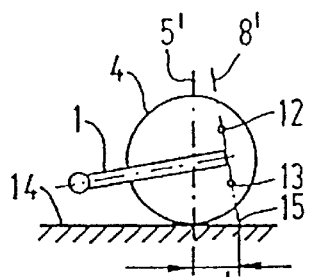
Figure 9:
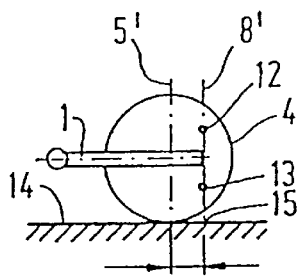
Figure 10:
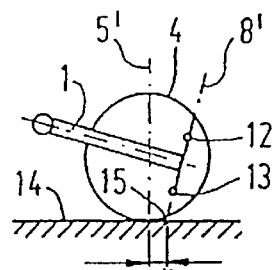

In principle the imaginary upwardly extending pivot axis occupies a fixed position with respect to the wheel suspension arm in the above-described construction. This implies that the position of pivot axis 8' with respect to the road surface depends on the wheel load, as is diagrammatically shown in FIGS. 8–10, whereby the intersection point 15 of the imaginary pivot pin 8 with the road surface 14 will be located at a considerably larger distance e' from the vertical plane 5' through wheel axle 5 at a large wheel load than will be the case with a smaller wheel load, as is indicated by distances e and e" respectively. It will be preferred to maintain as much as possible the same distance between the vertical plane 5' through wheel axle 5 and the intersection point of the imaginary pivot axis 8' with the road surface 14 during operation, independently of the wheel load. In principle this could be realised by a suitable selection of the dimensions of the above-described rubber bushes forming coupling points 12 and 13, which interconnect the various parts in the above-described manner, but in practice it has become apparent that it is difficult to achieve an optimum effect with the above-described single, more or less bush-shaped rubber elements, since a substantial deformation in the direction of rotation of the suspension member 6 of wheel 4 is thereby required of such elements, whilst a very great stiffness would be needed in vertical direction and in a direction transversely to the longitudinal axis of the vehicle.

Figure 11:
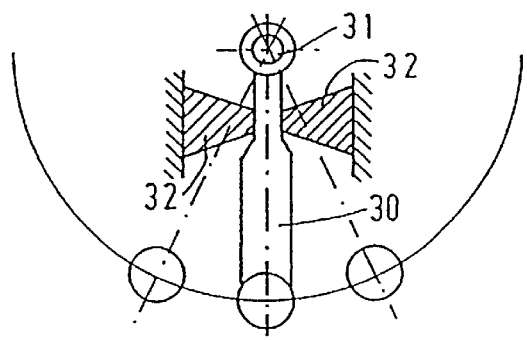

In order to solve this problem in a simple and efficient manner the connecting rod 30 shown in plan view in FIG. 11 is used, which connecting rod is capable of pivoting movement about an upwardly extending axis 31. Connecting rod 30 is thereby retained, at some distance from the upwardly extending pin 31, between two resilient elements 32 made up of blocks of rubber or a similar material in the illustrated embodiment, which attempt to keep rod 30 in the central position shown in FIG. 11.

Figure 17:
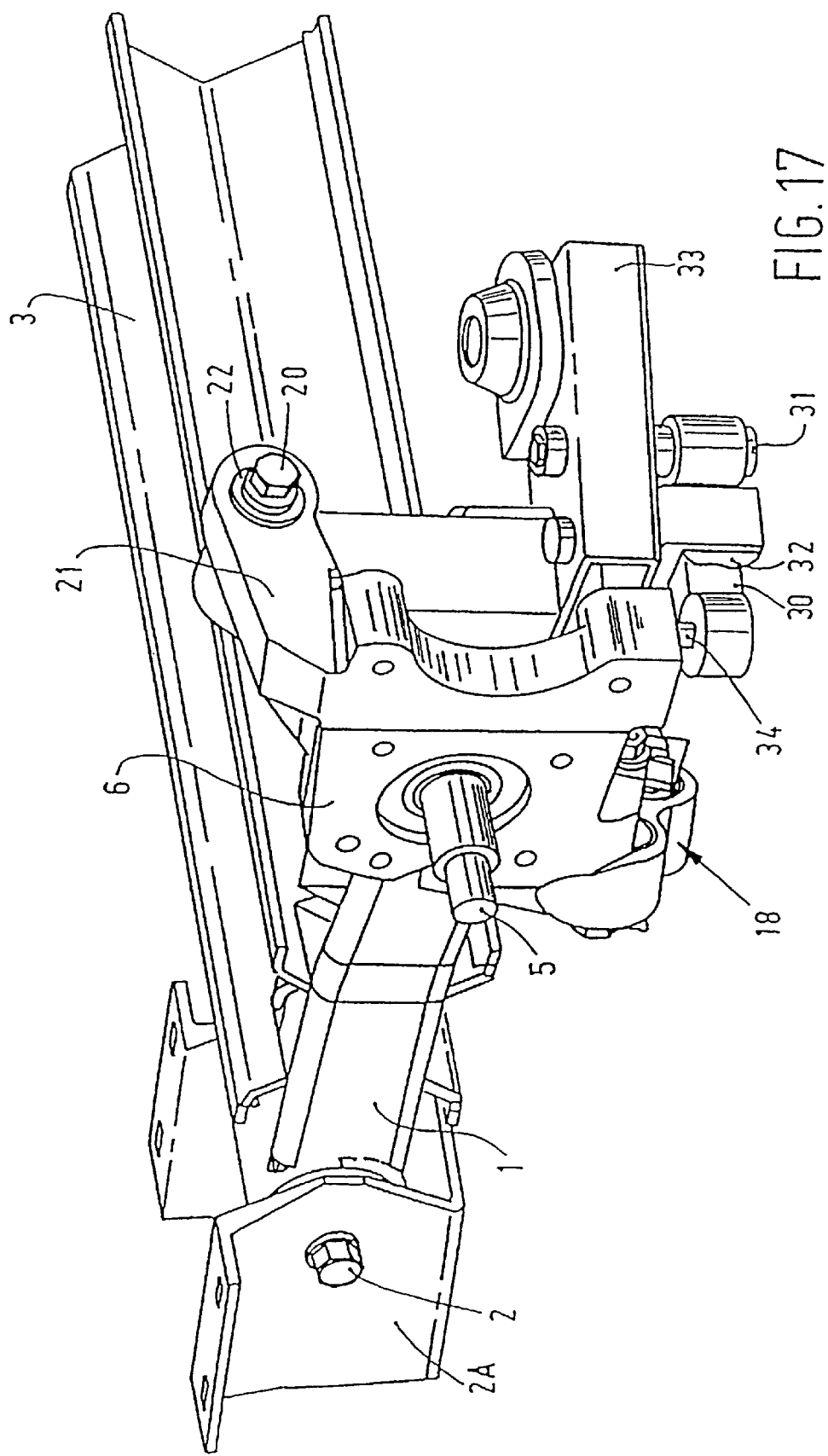
FIG. 17 is a diagrammatic perspective view of a second embodiment of the construction according to the invention.

Said rod is incorporated in the construction shown in FIG. 17, which largely corresponds with the construction shown in FIGS. 15 and 16, which is why parts corresponding with parts shown in FIGS. 15 and 16 are indicated by the same numerals as in FIGS. 15 and 16.

As will be apparent upon comparison of FIGS. 15 and 16 with FIG. 17, the connection of suspension member 6 by means of pin 23 has been substituted for a connection by means of connecting rod 30 in the embodiment of FIG. 17, which connecting rod is pivoted, by means of upwardly extending axis 31, to an arm 33 attached to wheel suspension arm 1 and extending transversely thereto, whilst the other end of coupling arm 30 is coupled to suspension member 6 of wheel 4 by means of a pin 34 extending parallel to pin 31.

In this embodiment the wheel load is mainly transmitted from suspension member 6 to wheel suspension arm via pin 22.

The operation of this construction can be explained with reference to FIGS. 12–14.

Figure 13:
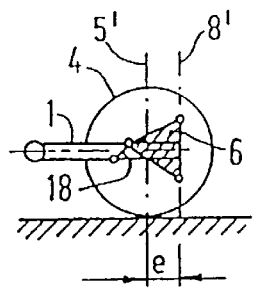
Figure 14:
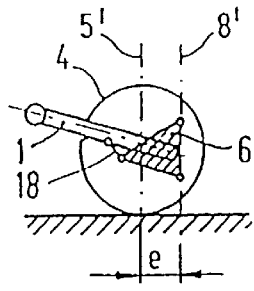

FIG. 13, for example, shows the situation in the case of an average load, whereby the distance between the intersection point 15 between the imaginary, upwardly extending pivot axis 8' and the vertical plane through wheel axle 5 equals e.

Figure 12:
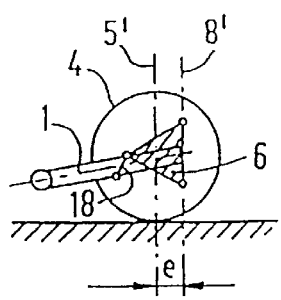

When the wheel load increases, wheel suspension arm 1 will for example pivot to the position shown in FIG. 12, whilst suspension member 6 will pivot about imaginary axis 19 in the direction according to arrow C, as is indicated in FIG. 6. This will cause coupling rod 30 to pivot in clockwise direction about axis 31, seen in FIG. 11, so that when the dimensions of the various parts is correctly selected, it will be possible to keep the distance e from intersection point 15 between the upwardly extending pivot axis 8' and the roadway to the vertical plane 5' through the wheel axle substantially the same as in the situation shown in FIG. 13. When conversely the wheel load decreases, coupling rod 18 will take up a flatter position, as shown in FIG. 14, whilst suspension member 6 will pivot in anti-clockwise direction about imaginary axis 19 (FIG. 6). Also in this case the aforesaid distance between point 15 and the vertical plane 5' through the wheel axle can remain substantially the same as the corresponding distance in FIG. 13.

What is claimed is:

1. A motor vehicle comprising steerable front wheels supporting the vehicle and rear wheels supporting the vehicle, at least one rear wheel of which is coupled, by means of an at least substantially horizontal axle journal extending transversely to the longitudinal direction of the vehicle, to a wheel suspension arm extending at least substantially in the longitudinal direction of the vehicle, which arm is capable of pivoting movement with respect to the other part of the vehicle about a horizontal pivot axis extending at least substantially perpendicularly to the longitudinal direction of the vehicle, whereby said rear wheel is capable of pivoting movement against spring force about an upwardly extending pivot axis with respect to said wheel suspension arm from the position intended for normal forward movement, in which said upwardly extending pivot axis is positioned behind the axle journal of the rear wheel, seen in the intended direction of forward movement, the axle journal of said rear wheel is attached to a wheel suspension member, which is capable of pivoting movement with respect to said wheel suspension arm about said upwardly extending pivot axis, whilst a coupling rod is provided between a coupling point which is located on said wheel suspension member and is spaced from the upwardly extending pivot axis by some distance and a coupling point which is located on said wheel suspension arm, which coupling rod is provided with resilient means, all this in such a manner that the distance between said coupling points can change as a result of deformation of said resilient means, wherein the wheel suspension member is capable of tilting movement about a tilting axis extending transversely to the longitudinal direction of the vehicle, whilst said upwardly extending pivot axis intersects the ground in a point which lies at least substantially in the central longitudinal plane of the respective rear wheel during forward movement.

2. A motor vehicle according to claim 1, wherein the coupling point of said coupling rod to said wheel suspension member is positioned higher than the coupling point of the coupling rod to the wheel suspension arm.

3. A motor vehicle according to claim 1, wherein said coupling rod is coupled in said coupling points by means of pivot pins, which extend at least substantially parallel to a plane extending in the longitudinal direction of the vehicle and which are surrounded by bushes of a resilient material.

4. A motor vehicle according to claim 1 or 2, wherein said coupling rod is positioned ahead of said upwardly extending pivot axis, seen in the intended direction of forward movement.

5. A motor vehicle according to claim 1, wherein the wheel suspension member supporting said axle journal is connection to said wheel suspension arm by means of two pins positioned one above the other, which extend at least substantially parallel to a plane extending in the longitudinal direction of the vehicle, which pins are surrounded by bushes consisting of a resilient material.

6. A motor vehicle according to claim 1, wherein said wheel suspension member supporting said axle journal is coupled to said wheel suspension arm by means of a pin extending at least substantially parallel to a plane extending in the longitudinal direction of the vehicle, which pin is surrounded by a bush consisting of a resilient material, and by means of a connecting rod, which is capable of pivoting movement against spring force from central position, about an upwardly extending pivot axis, both with respect to said wheel suspension arm and with respect to said suspension member.

7. A motor vehicle according to claim 1, wherein said upwardly extending pivot axis slopes upwards from the point where the pivot pin intersects the ground in the direction of the central longitudinal plane of the vehicle.

\* \* \* \* \*